April 30, 1935.  G. A. THOREN  1,999,427

DEVICE FOR ROTATING THERMOMETERS

Filed July 27, 1934

Inventor
Gustav A. Thoren

By Clarence A. O'Brien
Attorney

Patented Apr. 30, 1935

1,999,427

UNITED STATES PATENT OFFICE 1,999,427

DEVICE FOR ROTATING THERMOMETERS

Gustav A. Thoren, San Francisco, Calif.

Application July 27, 1934, Serial No. 737,277

1 Claim. (Cl. 73—52)

This invention relates to a device for revolving thermometers, the general object of the invention being to provide simple means for shaking the mercury in a thermometer to a low level by means of a device having a hole in its center for receiving the top part of the thermometer and stems whereby the device with the thermometer therein can be readily rotated.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing, wherein like characters denote like or corresponding parts throughout the several views, and in which:—

Figure 1:
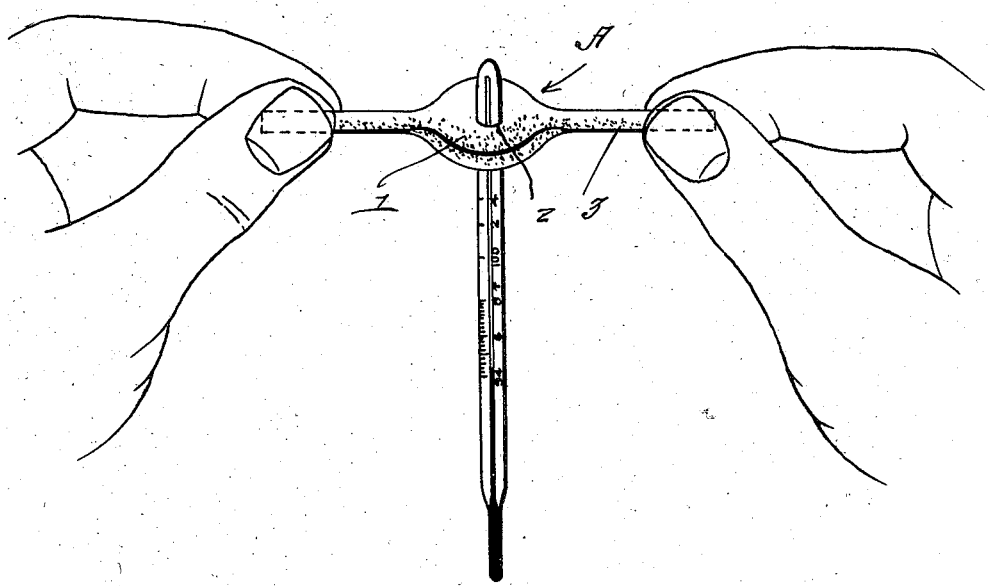
Fig. 1 is a view showing the device in use.
Figure 2:
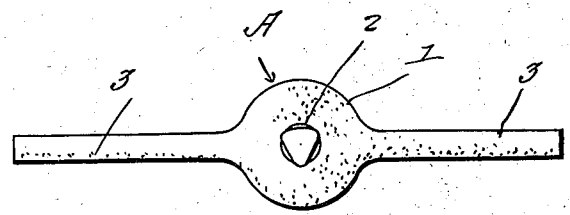
Fig. 2 is a top plan view of the device with the thermometer therein.

The device is shown at A and is formed of rubber or the like and is composed of a circular central portion 1 having a centrally arranged hole 2 therein for receiving the upper end of the thermometer with oppositely arranged stems 3 connected with the central portion, each stem being of circular shape in cross section. The device is gripped as shown in Fig. 1 with the finger and thumb of one hand holding one stem lightly while the thumb and finger of the other hand imparts a rotating movement to the other stem so that the device with the thermometer therein will be rotated and thus the mercury in the thermometer will be shaken down.

It is thought from the foregoing description that the advantages and novel features of the invention will be readily apparent.

It is to be understood that changes may be made in the construction and in the combination and arrangement of the several parts, provided that such changes fall within the scope of the appended claim.

I claim:—

A device of the class described comprising a member formed of resilient material and including a circular central portion having a hole therein for receiving the top part of the thermometer, oppositely arranged integral stems of circular shape in cross section and constructed of resilient material.

GUSTAV A. THOREN.